United States Patent [19]

Wright et al.

[11] Patent Number: 4,645,538
[45] Date of Patent: Feb. 24, 1987

[54] ASPHALTIC COMPOSITIONS

[75] Inventors: William E. Wright; Edward F. Zaweski, both of Baton Rouge, La.

[73] Assignee: Ethyl Corporation, Richmond, Va.

[21] Appl. No.: 739,978

[22] Filed: May 31, 1985

Related U.S. Application Data

[63] Continuation-in-part of Ser. No. 686,083, Dec. 24, 1984, abandoned.

[51] Int. Cl.[4] .............................................. C08L 95/00
[52] U.S. Cl. .................................................. 106/273 N
[58] Field of Search ........................... 106/273, 273 N

[56] References Cited

U.S. PATENT DOCUMENTS 3,876,550  4/1975  Holubec .......................... 260/455 A
4,069,181  1/1978  Healy et al. .......................... 524/70

Primary Examiner—Theodore Morris
Attorney, Agent, or Firm—Donald L. Johnson; John F. Sieberth; W. G. Montgomery

[57] ABSTRACT

An asphaltic composition of enhanced utility for vehicular pavement is described. It comprises a road paving grade of asphalt in admixture with a small amount of an alkylene dithiocarbamate such as methylene bis(dibutyldithiocarbamate) characterized by having a reduced increase in absolute viscosity to original absolute viscosity after thin film aging as measured by ASTM Test D 1754 at 140° F. Such compositions exhibit enhanced resistance to oxidative degradation of the type normally experienced by road paving grades of asphalt.

15 Claims, 1 Drawing Figure

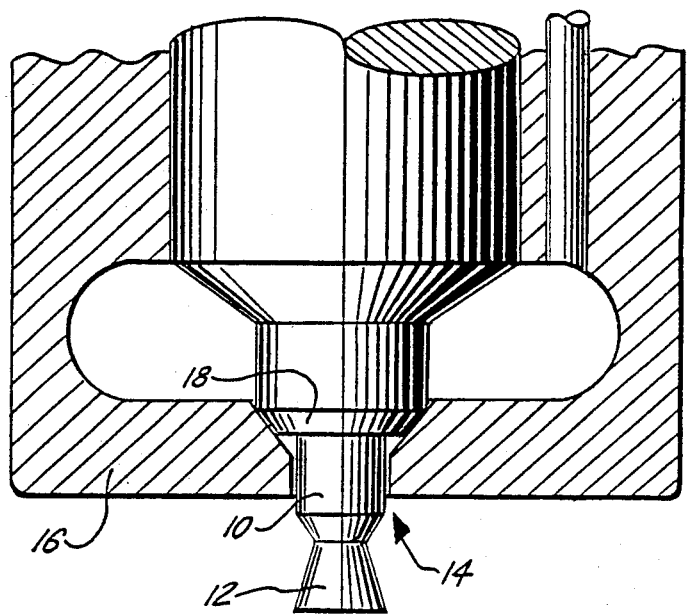

ASPHALTIC COMPOSITIONS

This application is a continuation-in-part of Ser. No. 686,083 filed Dec. 24, 1984 now abandoned.

This invention relates to asphaltic compositions and more particularly to road paving asphaltic compositions having enhanced resistance to oxidative degradation on exposure to the elements.

Asphalts are widely used in forming and repairing vehicular pavements. Unfortunately oxidative degradation of asphaltic road surfaces shortens their useful lives and necessitates expensive repair and replacement. Contributing to the complexity of the problem are the variations in stability which may exist from asphalt to asphalt, the strenuous usage which road surfaces must endure, and the continual exposure of the pavement to the elements (air, sunlight, heat, etc.) which slowly but surely brings about the degradation of the asphaltic pavement. Furthermore, as is generally acknowledged in the art, various compounds which are effective antioxidants or stabilizers for a variety of petroleum-based substrates—e.g., gasoline, lubricating oil, polyolefin polymers, etc.—are incapable of effectively stabilizing asphalts against such oxidative degradation.

It has now been discovered that asphalts which are normally highly susceptible to oxidative degradation can be made resistant to oxidative degradation by admixture therewith of small amounts of one or more alkylene dithiocarbamates.

This invention thus provides novel asphalt compositions of enhanced utility for vehicular pavement, improved methods of manufacturing such road paving grades of asphalt, and improved methods of forming asphaltic vehicular surfaces. These and other features and embodiments of this invention will become still further apparent from the ensuing description and appended claims.

The asphaltic compositions of this invention are compositions which are characterized by a reduced increase in viscosity after oxidation as measured by ASTM Test Designation D 1754.

The alkylene dithiocarbamates used in the practice of this invention usually will be admixed in the asphalt in amounts below about 15 percent by weight, preferably in the range of from about 0.1 to about 15 percent by weight, and most preferably in the range of from about 0.5 to about 5 percent by weight.

Typical asphalt stabilizers of this invention may be depicted by the general formula

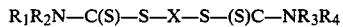

$$R_1R_2N-C(S)-S-X-S-(S)C-NR_3R_4$$

wherein $R_1$, $R_2$, $R_3$ and $R_4$ are independently selected from hydrogen and alkyl. The combined total number of carbon atoms of $R_1$, $R_2$, $R_3$ and $R_4$ is at least about 8 and X represents an alkylene radical having from 1 up to about 8 carbon atoms.

Each of $R_1$, $R_2$, $R_3$ and $R_4$ will preferably be an alkyl radical having from 1 to about 18 carbon atoms. The preferred range of carbon atoms in each of these alkyl radicals is from 1 to about 8. The total number of carbon atoms in $R_1$, $R_2$, $R_3$ and $R_4$ is at least about 8 with an upper limit of about 70 carbon atoms.

The alkylene radical, X, in the subject dithiocarbamates may be either a straight-chain alkylene, a branched-chain alkylene or an aromatically substituted alkylene. In general, the range of carbon atoms in the alkylene group is from 1 to about 8. The preferred alkylene radical is methylene (—CH$_2$—).

The alkylene dithiocarbamates are known in the art and several methods for their preparation also are known. These compounds and methods for their preparation are more fully described in U.S. Pat. No. 3,876,550 issued Apr. 8, 1975.

Exemplary compounds include:
methylene bis(dipropyldithiocarbamate)
methylene bis(diisopropyldithiocarbamate)
methylene bis(dibutyldithiocarbamate)
methylene bis(diamyldithiocarbamate)
methylene bis(dihexyldithiocarbamate)
methylene bis(diheptyldithiocarbamate)
methylene bis(dioctyldithiocarbamate)
methylene bis(didecyldithiocarbamate)
methylene bis(didodecyldithiocarbamate)
methylene bis(dicetyldithiocarbamate)
methylene bis(isopropylhexyldithiocarbamate)
methylene bis(butyloctyldithiocarbamate)
methylene bis(octyldecyldithiocarbamate)
methylene bis(amyldithiocarbamate)
methylene bis(dodecyldithiocarbamate)
ethylene bis(diisopropyldithiocarbamate)
ethylene bis(dibutyldithiocarbamate)
ethylene bis(didecyldithiocarbamate)
ethylene bis(dodecyldithiocarbamate)
ethylene bis(isopropylhexyldithiocarbamate)
1,3-propylene bis(dibutyldithiocarbamate)
1,3-propylene bis(dioctyldithiocarbamate)
1,3-propylene bis(amylhexyldithiocarbamate)
1,3-propylene bis(decyldithiocarbamate)
1,4-butylene bis(dibutyldithiocarbamate)
1,4-hexylene bis(diisopropyldithiocarbamate)
1,6-hexylene bis(dibutyldithiocarbamate)
1,8-octylene bis(dibutyldithiocarbamate)
and many other similar alkylene dithiocarbamates.

Admixing of the alkylene dithiodicarbamate with the asphaltic material is normally accomplished by heating the asphalt until its viscosity is low enough to permit mechanical stirring. The alkylene dithiodicarbamate can then be added and homogeneously admixed with the asphalt.

It will be appreciated that the asphalts used in the practice of this invention are normally solid asphaltic products of the type used in the formation of vehicular pavements by known methods. They can be any of the well-known bituminous substances obtained from natural sources or derived from a number of materials such as petroleum, shale oil, coal tar and the like. They may be residual asphalts, steam-reduced asphalts, propane precipitated asphalts, oxidized asphalts, pressure still "tars", or the like, as well as mixtures of two or more such materials as long as the asphalt is a road paving grade of asphalt. The specifications for road paving grades of asphalts may vary to some extent depending upon locality and source. Methods for the production of such asphalts are of course well known to those skilled in the art.

The practice and advantages of this invention will be still further apparent from the following illustrative examples.

Example 1

A road paving grade asphalt having a minimum flash point of 450° F., an absolute viscosity of between 800 and 1200 poises measured at 140° F., a minimum penetration of 85 (at 77° F. measured by a Penetrometer) and a solubility in trichloroethylene of 99 percent was subjected to ASTM Method D 1754. The initial absolute viscosity measured at 140° F. was 979.8 poises and penetration measured by ASTM D5 was 92. After heating at 325° F. (162.8° C.) for 5 hours, the absolute viscosity (measured at 140° F.) was 3829.3 poises. Penetration was 42.5.

Into another sample of the same asphalt was mechanically admixed one percent by weight of methylene bis(dibutyldithiocarbamate) and the initial absolute viscosity of the mixture (measured at 140° F.) was 843.6 poises. Penetration was 101. After heating at 325° F. (162.8° C.) for 5 hours, the absolute viscosity (measured at 140° F.) was 2991.3 poises. Penetration was 51.1.

Thus, the presence of alkylene dithiocarbamate resulted in a reduction of increase in viscosity of the asphaltic composition thereby demonstrating the usefulness of the asphaltic compositions of this invention for road paving purposes after the accelerated aging test.

Other modifications and variations of the present invention will now be readily apparent in light of the above teachings. It is therefore to be understood that changes may be made in the particular embodiments described above which are within the spirit and intended scope of the invention as defined in the appended claims.

We claim:

1. An asphaltic composition of enchanced utility for vehicular pavement which composition comprises a road paving grade of asphalt in admixture with at least one alkylene dithiocarbamate, said composition characterized by having a reduced increase in absolute viscosity to original absolute viscosity after thin film aging as measured by ASTM Test D 1754 at 140° F.

2. The composition of claim 1 wherein said alkylene dithiocarbamate is present in an amount falling within the range of from about 0.1 to about 15 percent by weight based on the weight of the asphalt.

3. The composition of claim 1 wherein said alkylene dithiocarbamate corresponds to the general formula:

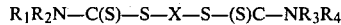

$$R_1R_2N-C(S)-S-X-S-(S)C-NR_3R_4$$

wherein $R_1$, $R_2$, $R_3$ and $R_4$ are independently selected from hydrogen and alkyl radicals having from 1 to 18 carbon atoms each and X represents an alkylene radical having from 1 to about 8 carbon atoms.

4. The composition of claim 3 wherein the total number of carbon atoms of $R_1$, $R_2$, $R_3$ and $R_4$ is at least about 8 and X represents an alkylene radical having from 1 to about 8 carbon atoms.

5. The composition of claim 4 wherein said alkylene dithiocarbamate is methylene bis(dibutyldithiocarbamate).

6. In a method of forming an asphaltic vehicular surface, the improvement which comprises employing as said surface a road paving grade of asphalt in admixture with a small amount of at least one alkylene dithiocarbamate, said surface characterized by having a reduced increase in absolute viscosity to original absolute viscosity after thin film aging as measured by ASTM Test D 1754 at 140° F.

7. The improvement of claim 6 wherein said alkylene dithiocarbamate is present in an amount falling within the range of from about 0.1 to about 15 percent by weight based on the weight of the asphalt.

8. The improvement of claim 6 wherein said alkylene dithiocarbamate corresponds to the formula:

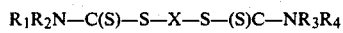

$$R_1R_2N-C(S)-S-X-S-(S)C-NR_3R_4$$

wherein $R_1$, $R_2$, $R_3$ and $R_4$ are independently selected from hydrogen and alkyl radicals having from 1 to 18 carbon atoms each and X represents an alkylene radical having from 1 to about 8 carbon atoms.

9. The improvement of claim 8 wherein the total number of carbon atoms of $R_1$, $R_2$, $R_3$ and $R_4$ is at least about 8 and X represents an alkylene radical having from 1 to about 8 carbon atoms.

10. The improvement of claim 9 wherein said alkylene dithiocarbamate is methylene bis(dibutyldithiocarbamate).

11. A method of manufacturing an asphaltic composition of enhanced utility for vehicular pavement, said method comprising forming a road paving grade of asphalt and admixing therewith a small amount of at least one alkylene dithiocarbamate such that said composition is characterized by having a reduced increase in absolute viscosity to original absolute viscosity after thin film aging as measured by ASTM D 1754 at 140° F.

12. The improvement of claim 11 wherein said alkylene dithiocarbamate is present in an amount falling within the range of from about 0.1 to about 15 percent by weight based on the weight of the asphalt.

13. The improvement of claim 11 wherein said alkylene dithiocarbamate corresponds to the general formula

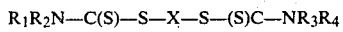

$$R_1R_2N-C(S)-S-X-S-(S)C-NR_3R_4$$

wherein $R_1$, $R_2$, $R_3$ and $R_4$ are independently selected from hydrogen and alkyl radicals having from 1 to 18 carbon atoms each and X represents an alkylene radical having from 1 to about 8 carbon atoms.

14. The improvement of claim 13 wherein the total number of carbon atoms of $R_1$, $R_2$, $R_3$, and $R_4$ is at least about 8 and X represents an alkylene radical having from 1 to about 8 carbon atoms.

15. The improvement of claim 14 wherein said alkylene dithiocarbamate is methylene bis(dibutyldithiocarbamate).

* * * * *

UNITED STATES PATENT AND TRADEMARK OFFICE
CERTIFICATE OF CORRECTION

PATENT NO. : 4,645,538

DATED      : February 24, 1987

INVENTOR(S) : WILLIAM E. WRIGHT, ET AL

It is certified that error appears in the above-identified patent and that said Letters Patent is hereby corrected as shown below:

Delete the drawing including the reduced size drawing on the face page.

Signed and Sealed this

Twenty-ninth Day of December, 1987

*Attest:*

DONALD J. QUIGG

*Attesting Officer*     *Commissioner of Patents and Trademarks*